United States Patent Office 3,271,253
Patented Sept. 6, 1966

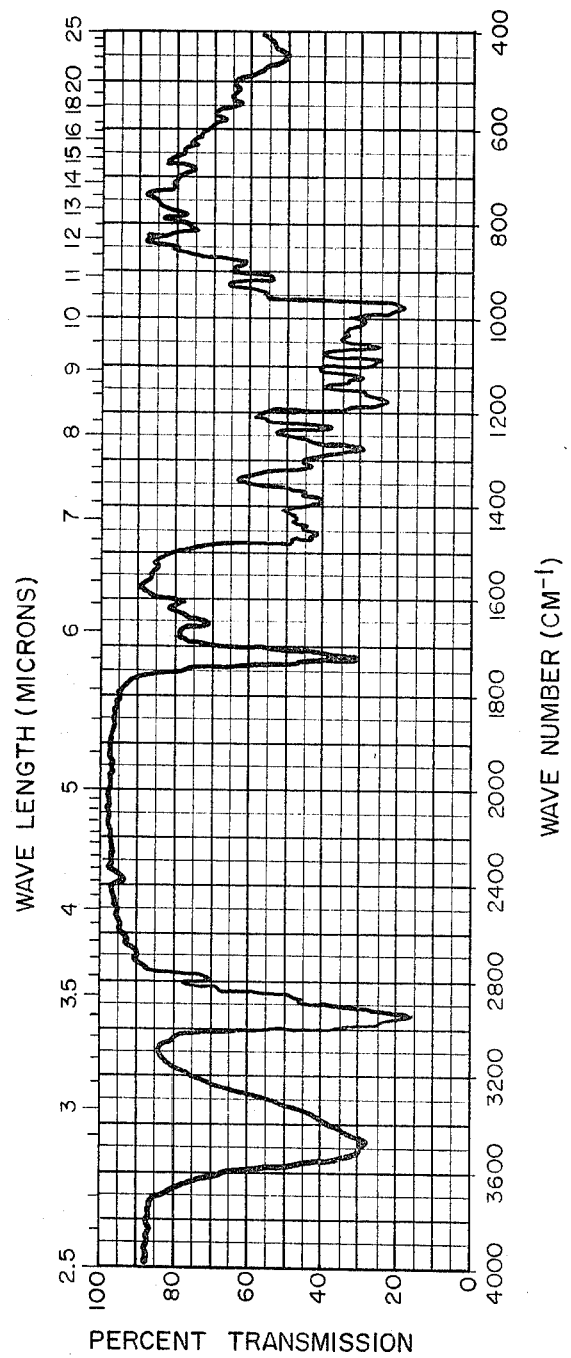

3,271,253
ANTIBIOTIC OSSAMYCIN AND METHOD OF PREPARING SAME
Kenneth E. Price, Fayetteville, and Henry Schmitz, Syracuse, N.Y., assignors to Bristol-Myers Company, New York, N.Y., a corporation of Delaware
Filed Nov. 19, 1964, Ser. No. 412,372
5 Claims. (Cl. 167—65)

This invention relates to a new and useful substance herein designated ossamycin, and to processes for its production. More particularly, this invention relates to processes for its production by fermentation and methods for its recovery and purification. The invention embraces this antibiotic in dilute solutions, as crude concentrates and as purified solids. Ossamycin is markedly toxic to many types of neoplastic tissue cells and has an inhibitory action against the growth of certain microorganisms, including bacteria, yeasts and protozoa. Thus, ossamycin is useful in separating and classifying mixtures of microorganisms for biological research, and for the removal of microorganisms from laboratory equipment and medical and dental instruments.

There is provided according to the present invention, the process for the production of an antibiotic, designated ossamycin, which comprises cultivating an ossamycin-producing variety of Streptomyces hygroscopicus designated Streptomyces hygroscopicus var. ossamyceticus, e.g., A.T.C.C. 15420, in an aqueous carbohydrate solution containing a nitrogenous nutrient under submerged aerobic conditions until substantial activity against HeLa cells is imparted to said solution, and, then if desired, recovering said ossamycin from said solution. There is further included within the scope of the present invention, the ossamycin so-produced.

The microorganism producing the antibiotic ossamycin of the present invention was isolated from a sample of soil collected in South America, and is a new variety of the species, Streptomyces hygroscopicus, and has been designated Streptomyces hygroscopicus var. ossamyceticus. A culture of the living organism given the laboratory designation C-8158, has been deposited in the American Type Culture Collection, Rockville, Md., and added to its permanent collection of microorganisms as A.T.C.C. 15420.

Streptomyces hygroscopicus var. ossamyceticus is characterized by the formation of gray sporulating aerial mycelium, spiral sporophores and dark hygroscopic patches in the aerial mycelium.

Petri dish cultures of the ossamycin-producing organism grown at 28° C. in a crosshatch pattern on Inorganic Salts-Starch Agar, as described by Pridham et al., in Applied Microbiology, pp. 947–953 (1956–1957), and examined at 2, 7, and 14 days revealed the following microscopic morphology:

Vegetative mycelium: Branched, ca. 0.75–1.0µ in diameter, no evidence of fragmentation.

Aerial mycelium: Branched, ca. 0.75–1.0µ in diameter.

Sporophore morphology: Short side branches located along the main axial hyphae terminate in tight spiral spore chains of two to many turns; sporophores arranged singly, in pairs or in clusters along the axial hyphae; no evidence of whorl formation.

Conidia: Catenulate, subglobose to elongated ovoid, most conidia ovoid measuring ca. 0.75 x 1.0–1.5µ, walls smooth.

Streptomyces hygroscopicus var. ossamyceticus, A.T.C.C. 15420, exhibits the following cultural characteristics when grown in a crosshatch pattern on the indicated nutrient media for 14 days at 28° C. The capitalized color names used in the description correspond to those in A Dictionary of Color, Maerz and Paul, (1950).

MEDIUM NO. 1 TOMATO PASTE-OATMEAL AGAR

Vegetative: Moderate, grayish white becoming brown.
Aerial Mycelium: Moderate, Cuban Sand (Pl 13–A3) to Sandy Beige (Pl 14–A3), surface becoming moist within 14 days.
Reverse: Suntan (Pl 13–B7) to Sepia (Pl 8–A10).
Soluble Pigment: Light brown to light greenish brown.
Remarks: Non-chromogenic.

MEDIUM NO. 2 GLUCOSE-YEAST-MALT AGAR

Vegetative: Abundant, grayish white.
Aerial Mycelium: Moderate, Taupe (Pl 16–A6), surface becoming moist within 14 days.
Reverse: Arizona (Pl 13–E6).
Soluble Pigment: Light brown to light greenish brown.
Remarks: Non-chromogenic.

MEDIUM NO. 3 BENNETT'S AGAR

Vegetative: Moderate, colorless to yellowish gray.
Aerial Mycelium: White with a few scattered patches of gray.
Reverse: Pastel Gray (Pl 11–D3).
Soluble Pigment: None.

MEDIUM NO. 4 TRYPTONE-GLUCOSE AGAR

Vegetative: Moderate, grayish yellow to light brown.
Aerial Mycelium: None.
Reverse: Cochin (Pl 7–A12).
Soluble Pigment: Brown.
Remarks: Chromogenic.

MEDIUM NO. 5 NUTRIENT AGAR

Vegetative: Moderate, grayish yellow.
Aerial Mycelium: None.
Reverse: Maple (Pl 11–E4).
Soluble Pigment: Light yellowish brown.
Remarks: Non-chromogenic.

MEDIUM NO. 6 GLYCEROL-CALCIUM MALATE AGAR

Vegetative: Moderate, cream, feathery edge.
Aerial Mycelium: Powdery, scant, white to Flesh (Pl 11–A2).
Reverse: Champagne (Pl 11–B3).
Soluble Pigment: None to very pale grayish tan.
Remarks: Slow clearing of the medium.

MEDIUM NO. 7 STARCH-AMMONIA AGAR (INORGANIC SALTS-STARCH AGAR)

Vegetative: Moderate, penetrating deeply into the substrate, colorless to white.
Aerial Mycelium: Abundant, light gray to Owl (Pl 16–A9).
Reverse: Piping Rock (Pl 13–A2).
Soluble Pigment: None.

Remarks: Dark brown to black hygroscopic patches appear on the surface of the aerial mycelium at 4–6 days, gradually spreading over the entire surface within 14 days; starch hydrolyzed; spiral spore chains observed.

MEDIUM NO. 8. STARCH-NITRATE AGAR

Vegetative: Abundant, penetrating deeply into the substrate, colorless to white.
Aerial Mycelium: Abundant, floccose, grayish white to Agate Gray (P1 43–A1), surface pitted from the evaporation of large droplets of colorless exudate.
Reverse: Massicot (P1 10–D2).
Soluble Pigment: None.

MEDIUM NO. 9 GLUCOSE-NITRATE AGAR

Vegetative: Luxuriant, thick, folded, colorless to pale yellowish gray.
Aerial Mycelium: Abundant to moderate, white.
Reverse: Straw (P1 10–F2).
Soluble Pigment: None.

MEDIUM NO. 10 GLYCEROL-NITRATE AGAR

Vegetative: Moderate, colorless to pale yellowish gray.
Aerial Mycelium: Sparse, powdery, white.
Reverse: Oyster White (P1 10–B1).
Soluble Pigment: None.

MEDIUM NO. 11 SUCROSE-NITRATE AGAR

Vegetative: Moderate, colorless to Ivory (P1 10–B2).
Aerial Mycelium: None.
Reverse: Oyster White (P1 10–B1).
Soluble Pigment: None.

MEDIUM NO. 12 GLUCOSE ASPARAGINE AGAR

Vegetative: Moderate, white.
Aerial Mycelium: Scattered tufts, white to very pale grayish white.
Reverse: Milk White (P1 9–B1) to Oyster White (P1 10–B1).
Soluble Pigment: None.

Tables I and II below present results obtained in a series of miscellaneous physiological tests. These tests were carried out at 28° C. unless otherwise indicated.

*Table I*

| Medium | Remarks |
| --- | --- |
| Peptone Iron Agar and Yeast Extract. | Medium blackened (melanin positive). |
| Tryptose Blood Agar | Hemolysis negative, medium blackened. |
| Bennett's Agar | Catalase positive. |
| Organic Nitrate Broth | Rapid reduction to nitrite. |
| Synthetic Nitrate Broth | Do. |
| Starch-Ammonium Agar | Starch hydrolysis positive (10 mm. zone at 7 days). |
| Tryptone-Yeast Extract Broth. | Medium becomes brown within 2 days (melanin positive). |
| Purple Milk | No coagulation or peptonization, reddish brown ring, pH 6.2 after 21 days. |
| Dietz 0.1% Tyrosine Agar | Brownish black discoloration of substrate at 9 days. |
| Casein Agar | No clearing of casein at 14 days. |
| 15% Gelatin | No liquefaction of gelatin after 21 days, olive brown soluble pigment. |
| Potato Plug | Growth excellent as wrinkled, light yellowish brown vegetative, scant white aerial mycelium, plug discolored yellowish brown. |
| Cellulose Activity | Slight decomposition of filter paper strip in synthetic nitrate medium after 21 days. |
| Tyrosine Agar | Slight clearing of the tyrosine crystals after 14 days, brown soluble pigment formed. |
| Hypoxanthine Agar | Rapid clearing of the hypoxanthine crystals within 14 days, no soluble pigment formed. |
| Xanthine Agar | Xanthine crystals unchanged after 14 days, no soluble pigment formed. |
| Temperature Range | Grows well on Bennett's Agar at 28° C. and 35° C. No growth at 10 or 45° C. |
| Oxygen Requirement | Aerobic, will not grow under microaerophilic or anaerobic conditions. |

*Table II.—Assimilation of carbon compounds in a synthetic medium* *

| | | | | |
| --- | --- | --- | --- | --- |
| Xylose | + | Dulcitol | — | |
| Arabinose | + | Mannitol | + | |
| Rhamnose | + | Sorbitol | + | |
| Fructose | + | Inositol | + | |
| Galactose | + | Glycerol | + | |
| Glucose | + | Salicin | | |
| Maltose | + | Na Acetate | (—) | |
| Sucrose | + | Na Citrate | (—) | |
| Lactose | + | Na Oxalate | — | |
| Cellobiose | + | Na Salicylate | — | |
| Raffinose | + | Na Tartrate | — | |
| Soluble Starch | + | Na Succinate | (—) | |
| Dextrin | + | Ca Malate | (—) | |
| Inulin | + | Control | — | |

*Pridham, T. G. and Gottlieb, D., *Assimilation of Carbon Compounds in Synthetic Medium*, J. Bacteriol., 56:107–114, (1948).
  + = Definite utilization.
  (+) = Probable utilization.
  (—) = No utilization.
  — = No growth.

Culture A.T.C.C. 15420 forms gray sporulating aerial mycelium, tight spiral spore chains and dark hydroscopic patches in the aerial mycelium; these characteristics place this organism within the *Streptomyces hygroscopicus* group as defined by Tresner and Backus, in Applied Microbiology, 4:243–250 (1956).

Characteristics which distinguish *Streptomyces hydgroscopicus* var. *ossamyceticus*, A.T.C.C. 15420, from other strains of *Streptomyces hygroscopicus* are:

(a) formation of dark brown pigment in media containing tryptone;
(b) blackening of iron pepton agar;
(c) ability to produce ossamycin.

*Streptomyces hygroscopicus* var. *ossamyceticus*, when grown under suitable conditions, produces ossamycin. A fermentation broth containing ossamycin is prepared by inoculating spores or mycelia of the ossamycin-producing organism into a suitable medium and then cultivating under aerobic conditions. For the production of ossamycin, cultivation on a solid medium is possible, but for production in large quantity, cultivation in a liquid medium is preferable. The temperature of the cultivation may be varied over a wide range, 20–35° C., within which the organism may grow, but a temperature of 25–30° C. and a neutral pH, i.e., 6.0–8.0, are preferred. In the submerged aerobic fermentation of the organism for the production of ossamycin, the medium contains as the source of carbon a commercially available glyceride oil or a carbohydrate such as glycerol, glucose, maltose, sucrose, lactose, dextrin, starch, etc., in pure or crude states and as the source of nitrogen, an organic material such as soybean meal, distillers' solubles, peanut meal, cottonseed meal, meat extract, peptone, fish meal, yeast extract, corn steep liquor, etc., and when desired, inorganic sources of nitrogen such as nitrates and ammonium salts, and mineral salts such as sodium chloride, potassium chloride and magnesium sulfate, and buffering agents such as calcium carbonate or phosphates and trace amounts of heavy metal salts; such medium ingredients include those listed in Canadian Patent 513,324, and in British Patents 730,341 and 736,325, and in United States Patents 2,691,618, 2,658,018, 2,653,899, 2,586,762, 2,516,080, 2,483,892, 2,609,329 and 2,709,672. In aerated submerged culture, an antifoam such as liquid paraffin, fatty oils or silicone is used. More than one kind of carbon source, nitrogen source or antifoam may be used for the production of ossamycin. Generally, the cultivation is continued until at least several hundred mcg./ml. of ossamycin is accumulated in the medium. The active substance is contained about equally in the mycelia and in the fermentation liquor.

The mycelia are separated from the fermentation liquid, and then the mycelia are extracted with water-soluble solvents such as acetone, methanol, ethanol, and other low alcohols, or by water-immiscible solvents such as ether, chloroform, and the like. The mycelial solvent-extracts and the filtereal liquid are combined and concentrated and the active substance washed with water-insoluble solvents such as hydrocarbon solvent (boiling point, 63–75° C.), and extracted with ethyl acetate, and the like from the water-containing concentrate. The crude ossamycin is purified by liquid-liquid extraction methods, e.g., ether-hydrocarbon solvent (boiling point 63–75° C.) and ethanol-water solvent systems, or Craig's countercurrent distribution technique, and pure ossamycin is isolated as a crystalline solid.

Ossamycin is a stable white crystalline substance, and melts at 175–180° C. (hot stage uncorrected). It is very soluble in most organic solvents, e.g. methanol, ether, and very slightly soluble in water.

The specific rotation of ossamycin is $[\alpha]_D^{25°} = +8$ (c.=1, chloroform). The ultraviolet spectrum of a choroform solution shows a peak at 244 mμ.

The elemental analysis of ossamycin is as follows: C=64.70%; H=9.45%; N=1.50%; O=24.35% (by difference); and C-methyl=8.50%. No other elements are present. The molecular weight by thermoelectric determination is 917 and the analysis and molecular weight indicate that the molecular formula is $C_{50}H_{87}NO_{14}$.

The infrared absorption spectrum of ossamycin pelleted in potassium bromide, as shown in the attached drawing, exhibits absorption maxima at the following wave lengths in microns: 2.90, 3.40, 5.82, 6.9, 7.25, 7.65, 7.90, 8.17, 8.58, 8.97, 9.28, 9.5, 9.97, 10.3, 11.0 and 11.4.

Ossamycin gives a red color in concentrated sulfuric acid; the ultraviolet spectrum of this solution has peaks at 385 and 282 mμ with absorptivities of 6.0 and 26.0 respectively.

Solutions of ossamycin in aqueous alcohol are stable for 2 hours over a range of pH from 2.2 to 10.0 at room temperature. Aqueous alcohol solutions of ossamycin at neutral pH are stable for several weeks at room temperature. Ossamycin in the solid form is stable for several months at room temperature and under refrigeration.

Ossamycin is markedly toxic in vitro to the following types of neoplastic tissue cells: HeLa, human epidermoid carcinoma of cervix; KB, human epidermoid carcinoma of nasopharynx; Sarcoma 180; Ehrlich ascites (E.A.) carcinoma; L, mouse fibroblast and Leukemia 1210. The following table represents the cell culture toxicity data:

Table III.—Cell culture toxicity of ossamycin

| Types of Tissue Cells | $ID^{50}$ (μg./ml.) (Dose required to cause a 50% decrease in net protein production) |
|---|---|
| KB | 0.005 |
| EA | 0.008 |
| HeLa | 0.005 |
| S-180 | 0.008 |
| L | 0.007 |
| L-1210 | 0.003 |

The acute toxicity of ossamycin ($LD_{50}$) for Swiss mice is 1.8 mg./kg. by the intraperitoneal route.

The in vitro inhibitory activity of ossamycin for bacteria, yeasts and protozoa was determined in broth by two-fold serial dilution techniques. The agent was dissolved in ethanol, and then appropriately diluted with water or growth medium.

Activity against filamentous fungi was also determined by means of tube dilution methods. For these tests, ossamycin was evaluated at ten-fold concentrations ranging from 0.1 to 100 μg./ml. Mycophil broth (Baltimore Biological Laboratories, Baltimore, Maryland) containing each of the various levels of antibiotic was dispersed in 2 ml. volume into 20 x 150 mm. tubes. Inoculum was prepared by scraping spores and/or vegetative growth from a 7-day agar slope and making a slurry in physiological saline. The antibiotic-containing tubes were then inoculated with one drop of the fungal suspension and incubated at 28° C. for 2 days.

Ossamycin was found to have the following antimicrobial spectrum.

Table IV.—Antimicrobial spectrum of ossamycin

| | Test Medium* | Minimal Inhibitory Concentration |
|---|---|---|
| Anaerobic Bacteria: | | |
| Butyribacterium rettgeri ATCC 10825 | HI | 100 |
| Peptococcus prevotii ATCC 9321 | HI | 100 |
| Clostridium chauvoei ATCC 10092 | HI | 100 |
| Aerobic and Facultative Bacteria: | | |
| Bacillus subtilis | HI | 100 |
| Sarcina lutea ATCC 9341 | HI | 100 |
| Corynebacterium xerosis | HI | 100 |
| Diplococcus pneumoniae | HI | 100 |
| Staphylococcus aureus ATCC 6538 | HI | 100 |
| Streptococcus faecalis ATCC 8022 | HI | 100 |
| Streptococcus pyogenes | HI | 50 |
| Micrococcus lysodeikticus | HI | 50 |
| Brucella bronchiseptica ATCC 4617 | HI | >100 |
| Neisseria catarrhalis ATCC 8176 | HI | 100 |
| Salmonella typhosa | HI | 100 |
| Escherichia coli ATCC 9637 | HI | >100 |
| Mycobacterium smegmatis ATCC 607 | HI | >100 |
| Yeasts: | | |
| Candida albicans | Neo | 100 |
| Saccharamyces cerevisiae | Neo | >100 |
| Kloeckera brevis ATCC 9774 | Neo | 25 |
| Filamentous Fungi: | | |
| Aspergillus fumigatus | Myco | 10 |
| Trichophyton mentagrophytes | Myco | 10 |
| Penicillium chrysogenum | Myco | 10 |
| Pullularia pullulans | Myco | 1 |
| Monascus purpurea | Myco | 1 |
| Thamnidium elegans | Myco | 1 |
| Protozoa: | | |
| Tetrahymena pyriformis | PMM | 100 |
| Ochromonas mahamensis | PMM | 1.6 |
| Crithidia fasciculata | PMM | 100 |

*HI=Heart Infusion Broth ("Difco").
Neo=Neopeptone Broth (2% glucose, 1% Neopeptone).
Myco=Mycophil Broth (BBL).
PMM=Protozoa Maintenance Medium (West, R. A. Jr., Murrell, C. B., and Barbera, B. W., "Use of the Agar Layer Method for Determining Antibiotic Activity Against Selected Protozoa," Bacteriological Proceedings (1960), p. 70.

The following examples are intended to illustrate the invention described herein without unduly restricting it.

EXAMPLE 1.—FERMENTATION

Streptomyces hygroscopicus var. ossamyceticus, A.T.C.C. 15420, is cultivated for 40 hours at 27° C. in shaker flasks in an aqueous medium containing 2% glucose, 1.0% cottonseed endosperm flour (Pharmamedia, Trader Oil Mill Company, Fort Worth, Texas), 1.0% (by volume) corn steep liquor, 0.40% calcuim carbonate, 0.3% ammonium sulfate, and 0.003% zinc sulfate heptahydrate. A 4% inoculum is then used to seed an aqueous production medium containing 4.0% glucose, 1% soybean meal, 0.5% sodium chloride, and 0.1% calcium carbonate. The fermentation is carried out on rotary shakers in 500 ml. Erlenmeyer flasks (20) containing 100 ml. of medium for 3 days at 27° C. The fermentation liquor is found to contain 0.1 μg. of ossamycin per milliliter, and to have substantial activity versus HeLa cells.

EXAMPLE 2.—FERMENTATION

The seed medium described in Example 1 is also used to inoculate 10-gallon fermentation tanks. The aqueous medium used for the production contains 1% glucose, 1.25% dry distillers' solubles and 1% calcium carbonate. The fermentation is carried out without agitation at 28° C. with airflow at 3.8 cubic feet per minute, and 0.7 atmospheres head pressure for 40 hours. The fermentation liquor is found to contain 0.1 μg. of ossamycin per milliliter, and to have substantial activity versus HeLa cells.

EXAMPLE 3.—RECOVERY OF OSSAMYCIN

The mycelium is separated from the fermentation broth obtained as described hereinabove, by filtration, using diatomaceous earth filter aid. The filtered fermentation liquor (2000 liters) is extracted with one-quarter volume of chloroform. The wet mycelial filter cake contains about one-half of the total activity and is extracted with methanol; the methanol is removed by distillation in vacuo, and the residual aqueous solution extracted with chloroform. The combined extracts are concentrated (2 liters), diluted with "Skellysolve B" (hydrocarbon solvent, boiling point 63–75° C.), (10 liters) and passed through a column of activated magnesium silicate (Florisil, Floridin Company, Warren, Pennsylvania). The ossamycin is eluted with methanol, and then the methanol is removed by distillation, and the residue crystallized from ether- "Skellysolve B." The yield is 8 gm. of ossamycin. Crude ossamycin (5 gm.) is dissolved in a mixture of "Skellysolve B"-benzene-ethanol-water (2:3:4:1 parts) and put through 100 transfers in a Craig-Post machine. Only one peak appeared, at tube 71, using either a HeLa cell diffusion assay or a spectrophotometric assay. Ossamycin is recrystallized from ether-"Skellysolve B" and the antibiotic is found to have a melting point of 175–185° C. (hot stage, uncorrected).

While this invention has been described and exemplified in terms of its preferred embodiment, those skilled in the art will appreciate that modifications can be made without departing from the spirit and scope of this invention.

What is claimed is:

1. A composition of matter designated as ossamycin, said composition being characterized by ready solubility in ethyl alcohol and ethyl acetate, and slight solubility in water, and exhibiting in the pure state white crystals, a melting point of 175–180° C., a molecular weight of 917 by thermoelectric determination, an elemental analysis as follows: 64.70% carbon, 9.45% hydrogen, 1.50% nitrogen and 24.35% oxygen (by difference), an optical rotation of $[\alpha]_D^{25}=+8$ (c.=1 in chloroform), an ultraviolet absorption spectrum in chloroform exhibiting a maximum of 244 m$\mu$, an ultraviolet spectrum in concentrated sulfuric acid exhibiting a maxima at 385 and 282 m$\mu$ with absorptivities of 6.0 and 26.0 respectively, and an infrared absorption spectrum in potassium bromide as shown in the drawing.

2. The process of producing a biologically active substance, identified as ossamycin, which comprises cultivating an ossamycin-producing strain of *Streptomyces hygroscopicus* var. *ossamyceticus* under submerged aerobic conditions in an aqueous carbohydrate solution containing a nitrogenous nutrient until substantial activity versus HeLa cells is produced in said medium.

3. The process of producing a biologically active substance, identified as ossamycin, which comprises cultivating an ossamycin-producing strain of *Streptomyces hygroscopicus* var. *ossamyceticus* under submerged areobic conditions in an aqueous carbohydrate solution containing a nitrogenous nutrient until substantial activity versus HeLa cells is produced in said medium and then recovering from the broth the ossamycin thus produced.

4. The process of producing a biologically active substance, identified as ossamycin, which comprises cultivating an ossamycin-producing strain of *Streptomyces hygroscopicus* var. *ossamyceticus* under submerged aerobic conditions in an aqueous carbohydrate solution containing a nitrogenous nutrient at a temperature of substantially from 25–30° C. and for about one to six days.

5. The process of claim 2 wherein said ossamycin-producing strain is *Streptomyces hygroscopicus* var. *ossamyceticus* A.T.C.C. 15420.

No references cited.

JULIAN S. LEVITT, *Primary Examiner.*

SAM ROSEN, *Assistant Examiner.*